UNITED STATES PATENT OFFICE.

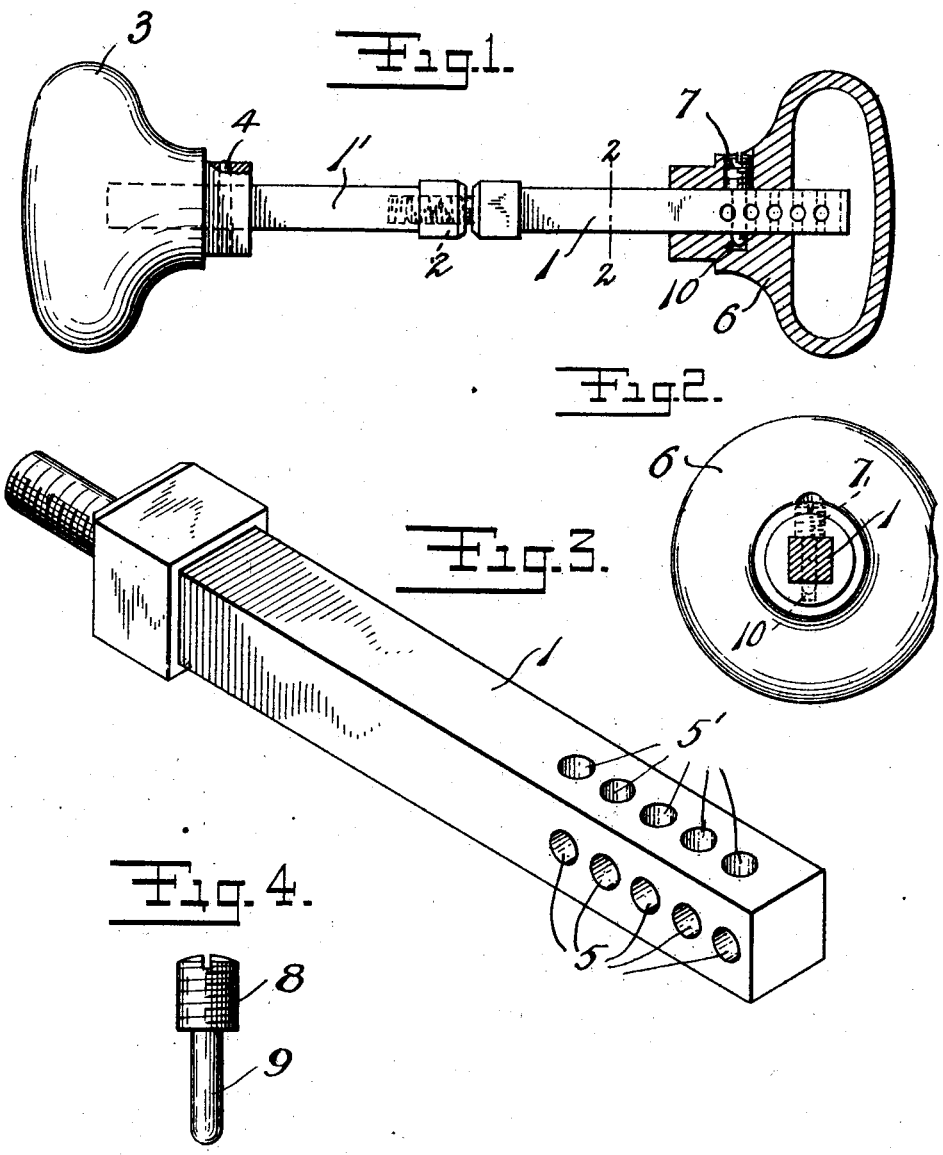

ERNEST L. TEICH, OF NEW BRITAIN, CONNECTICUT, ASSIGNOR TO THE AMERICAN HARDWARE CORPORATION, OF NEW BRITAIN, CONNECTICUT, A CORPORATION OF CONNECTICUT.

ADJUSTABLE LATCH-OPERATING MEANS.

1,405,695. Specification of Letters Patent. Patented Feb. 7, 1922.

Application filed April 22, 1919. Serial No. 291,902.

*To all whom it may concern:*

Be it known that I, ERNEST L. TEICH, a citizen of the United States, residing at New Britain, county of Hartford, State of Connecticut, have invented a certain new and useful Improvement in Adjustable Latch-Operating Means, of which the following is a full, clear, and exact description.

My invention relates to adjustable latch operating means and has for its object to provide a spindle and knobs which shall be adjustable to compensate for the varying thickness in doors to which the lock is to be applied. The following is a description of an embodiment of my invention reference being had to the accompanying drawings, in which, Fig. 1 shows a spindle and knobs secured thereto embodying my invention;

Fig. 2 is a section on the line 2—2, Fig. 1;

Fig. 3 is a perspective view of one end of the spindle, and

Fig. 4 is a detail of the screw dowel pin used in connection with my invention.

Referring more particularly to the drawings, 1—1' are two members of a swiveled spindle, the member 1 having a screw-threaded projection 2 entering the tapped hole in the member 1' so that the two members 1 and 1' can be turned relatively to one another and also so that they can be screwed apart to vary the length of the spindle as a whole. 3 is a knob secured by a dowel pin 4 to the member 1', the pin 4 being a driven pin and intended to be left in position when once inserted. The outer end of the portion 1 of the spindle is provided with two series of holes 5—5', said holes being at right angles to one another and breaking joints, the axes of the holes 5 passing between the axes of two adjacent holes 5'. 6 is a knob which is removably secured to the right hand end of the member 1' by a pin 7. This pin has a screw-threaded head 8 adapted to engage a tapped hole in the knob 6 and to bear against one side of the spindle 1 so as to have a clamping action upon the spindle. The pin is also provided with a plain shank 9, which, when the pin is in position, passes entirely through the member 1 and into a recess 10 in the knob 6 on the other side of the member 1, the whole constituting a screw dowel pin. By this means an easily removable dowel pin is provided, one end of which is concealed, which dowel pin can be passed through any one of the holes 5—5', thus permitting the knob 6 to be adjusted relatively to the member 1. This adjustment, however, can not be finer than the distance between the center of one hole 5 and the center of an adjacent hole 5'. The length of the spindle, however, can be adjusted by reason of the screw-threaded projection 2 and the recess in which it fits so that, in addition, an adjustment which is as fine as one-fourth of the width of the screw-thread upon the projection 2 can be obtained. By this means the combined knob and spindle can be adjusted to practically compensate for large and small variations in width in the doors to which the lock is to be applied.

The pin 7 being a screw-threaded pin can be easily removed and, inasmuch as both the ends of it are contained within sockets formed within the material of the knob, has all the advantages of a dowel pin in resisting pulling strain. Furthermore, the hole in the knob 6 into which the member 1 passes is a square hole, as shown in Fig. 2, so that even if the dowel pin should become loosened the knob would not turn upon the spindle.

As will be evident to those skilled in the art, my invention permits of various modifications without departing from the spirit thereof or the scope of the appended claim.

What I claim is:

In a combined knob and spindle, the combination of a square spindle having a series of perforations in its outer end, a knob having a square opening for such spindle, a dowel pin having a shank passing through and beyond said spindle and having a screw-threaded head of larger diameter than such shank, said head making screw-threaded engagement with said knob and bearing against one side of said shank so as to exert clamping pressure thereon, said knob having a recess for receiving the inner end of said shank.

ERNEST L. TEICH.